(12) United States Patent
Gallup

(10) Patent No.: US 9,022,329 B2
(45) Date of Patent: May 5, 2015

(54) CABLE TRAY AND ORGANIZER

(76) Inventor: Eric Gallup, Rochester, MI (US)

( * ) Notice: Subject to any disclaimer, the term of this patent is extended or adjusted under 35 U.S.C. 154(b) by 76 days.

(21) Appl. No.: 13/251,900

(22) Filed: Oct. 3, 2011

(65) Prior Publication Data
US 2012/0080565 A1  Apr. 5, 2012

Related U.S. Application Data

(60) Provisional application No. 61/389,542, filed on Oct. 4, 2010.

(51) Int. Cl.
*A47B 21/06* (2006.01)
*H02G 3/04* (2006.01)
*H04Q 1/06* (2006.01)
*A47F 5/01* (2006.01)

(52) U.S. Cl.
CPC ............... *H02G 3/0443* (2013.01); *H04Q 1/06* (2013.01); *A47B 21/06* (2013.01); *A47F 5/01* (2013.01); *A47B 2210/0024* (2013.01)

(58) Field of Classification Search
CPC ............ H04Q 1/06; A47F 5/01; A47B 21/06; A47B 2210/0024; H02G 3/0443
USPC .................. 248/175, 218.1, 249, 153, 465.1; 312/223.6; 211/119, 119.005, 133.5, 211/88.01, 85.31, 90.03, 106, 126.8, 126.9, 211/133.2, 181.1, 41.4, 112; 220/485; 174/500
See application file for complete search history.

(56) References Cited

U.S. PATENT DOCUMENTS

| 611,561 | A | * | 9/1898 | Cook | 68/197 |
| 1,100,851 | A | * | 6/1914 | Summers | 217/125 |
| 1,472,598 | A | * | 10/1923 | Jarvis | 220/491 |
| 1,580,847 | A | * | 4/1926 | Moineau | 248/302 |
| 1,631,725 | A | * | 6/1927 | Halvorsen | 211/85.31 |
| 2,204,446 | A | * | 6/1940 | Robinson | 108/161 |
| 2,225,681 | A | * | 12/1940 | Braun | 248/27.8 |
| 2,364,705 | A | * | 12/1944 | Geralds | 206/510 |
| 2,480,018 | A | * | 8/1949 | Greenberg | 248/153 |
| 2,655,267 | A | * | 10/1953 | Planeta | 211/74 |
| 2,923,415 | A | * | 2/1960 | Brown | 211/65 |
| 3,288,303 | A | * | 11/1966 | Dahl | 211/51 |

(Continued)

FOREIGN PATENT DOCUMENTS

| DE | 29803255 U1 | * | 5/1998 |
| FR | 2812774 A1 | * | 2/2002 |

(Continued)

*Primary Examiner* — Terrell McKinnon
*Assistant Examiner* — Eret McNichols
(74) *Attorney, Agent, or Firm* — Carlson, Gaskey & Olds P.C.

(57) ABSTRACT

A cable organizing device which mounts to an underside of a desk or to a wall, such that cables from computers and other equipment can be quickly and easily wrapped around the device, thus taking up the slack in each of the cables and keeping them off of the floor. The cable organizing device includes a plurality of loop hooks on each side, spaced apart such that individual cables can be wrapped around and between the loop hooks in a variety of ways. The device is designed to be easy and inexpensive to manufacture, yet sturdy and versatile in use. The cable organizing device can handle any type of wire or cable material, and the cables can be connected at both ends before being wrapped onto the cable organizing device. A mounting aid is included with the cable organizing device, thus making it easy for a person to install.

18 Claims, 4 Drawing Sheets

(56) References Cited

U.S. PATENT DOCUMENTS

| | | | | |
|---|---|---|---|---|
| 3,905,286 | A | * | 9/1975 | Le Grady ........................ 99/450 |
| 4,025,013 | A | * | 5/1977 | Anantharaman ........... 248/205.1 |
| 5,203,254 | A | * | 4/1993 | Fletcher ........................... 99/426 |
| 5,865,325 | A | * | 2/1999 | Comstock .................... 211/181.1 |
| D417,809 | S | * | 12/1999 | Hofman ........................ D6/525 |
| 6,318,570 | B1 | * | 11/2001 | Mueller et al. ............... 211/181.1 |
| 6,330,948 | B1 | * | 12/2001 | Leto .............................. 211/70.6 |
| 6,341,704 | B1 | * | 1/2002 | Michel, Jr. .................. 211/181.1 |
| 6,412,647 | B1 | * | 7/2002 | Ko ................................. 211/106 |
| 6,457,594 | B1 | * | 10/2002 | Tiemann ...................... 211/181.1 |
| 6,578,720 | B1 | * | 6/2003 | Wang ....................... 211/126.15 |
| 7,373,759 | B1 | * | 5/2008 | Simmons ...................... 52/220.5 |
| 7,407,059 | B2 | * | 8/2008 | Sullivan et al. ............... 211/41.3 |
| 8,256,637 | B2 | * | 9/2012 | Goodman et al. ............ 220/491 |
| 2001/0047968 | A1 | * | 12/2001 | Wright ......................... 211/41.3 |
| 2005/0056764 | A1 | * | 3/2005 | Thompson ..................... 248/547 |
| 2006/0255217 | A1 | * | 11/2006 | Wise .............................. 248/153 |
| 2007/0131629 | A1 | * | 6/2007 | Sullivan et al. ............... 211/41.3 |
| 2007/0144984 | A1 | * | 6/2007 | Sullivan et al. ............... 211/41.3 |
| 2008/0047916 | A1 | * | 2/2008 | Klingspor et al. ............ 211/153 |
| 2008/0185352 | A1 | * | 8/2008 | O'Hara ........................ 211/13.1 |
| 2009/0090073 | A1 | * | 4/2009 | Bravo et al. .................. 52/220.1 |
| 2009/0250420 | A1 | * | 10/2009 | Martin et al. ................. 211/134 |
| 2012/0175331 | A1 | * | 7/2012 | Yu ................................. 211/119 |

FOREIGN PATENT DOCUMENTS

| | | | | |
|---|---|---|---|---|
| FR | 2853464 | A1 | * 10/2004 | ............... H02G 3/04 |
| GB | 967132 | A | * 0/2000 | |
| GB | 648864 | A | * 1/1951 | |
| JP | 2007130184 | A | * 5/2007 | |

* cited by examiner

CABLE TRAY AND ORGANIZER

CROSS-REFERENCE TO RELATED APPLICATIONS

This application claims the benefit of the priority date of U.S. Provisional Patent Application Ser. No. 61/389,542, titled CABLE TRAY AND ORGANIZER, filed Oct. 4, 2010.

BACKGROUND OF THE INVENTION

1. Field of the Invention

This invention relates generally to a device for organizing computer cables and, more particularly, to a device for organizing cables for computers and other equipment which mounts to an underside of a desk or workstation and provides an open tray area and numerous hooks for holding the cables off of the floor and preventing them from becoming entangled.

2. Discussion of the Related Art

With the proliferation of computers and other electronic devices in office environments, the problem of cable clutter has grown increasingly worse. A computer alone typically requires a power cable for each of a CPU and a monitor, a video cable from the CPU to the monitor, speaker cables, a network cable, and possibly other cables for a mouse and keyboard. In addition, a typical person's desk also includes a telephone with at least one cable, a power strip with several power cords plugged into it, and oftentimes other power cords for lamps, personal electronic device chargers, and so forth. Printers, fax machines, network hubs, and other electronic devices further add to the cable management problem.

In most office environments, there is no good way to deal with the cable clutter, especially since the cables are generally running to and from multiple locations so that it is not possible to simply place them in a built-in channel in a desk. As a result, the cables under a person's desk are typically just left laying on the floor, possibly tucked behind a computer unit or shoved into a corner. Invariably, the cables present a problem, as they get hooked on someone's foot, catch on a chair leg or wheel, get vacuumed over, or otherwise get in the way. Not only can these cable snags damage the cables themselves, but they can present a safety hazard for a person who might trip over or be shocked by a cable.

There is a need for a cable organizing device which is easy to install, provides the capacity for organizing all of the cables in and around a person's desk, and allows the cables to be quickly and easily stowed away—so that they are not laying on the floor where they can become entangled, tripped over, or damaged.

SUMMARY OF THE INVENTION

In accordance with the teachings of the present invention, a cable organizing device is disclosed. The cable organizing device mounts to an underside of a desk, and cables from a computer and other equipment can be quickly and easily wrapped around the device, thus taking up the slack in each of the cables and keeping them off of the floor. The cable organizing device includes a plurality of loop hooks on each side, spaced apart such that individual cables can be wrapped around and between the loop hooks in a variety of ways. The device is designed to be easy and inexpensive to manufacture, yet sturdy and versatile in use. The cable organizing device can handle any type of wire or cable material, and the cables can be connected at both ends before being wrapped onto the cable organizing device. A convenient mounting aid is included with the cable organizing device, thus making it easy for a person to install.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a cable tray and organizer is merely exemplary in nature, and is in no way intended to limit the invention or its applications or uses. For example, the disclosed device may be useful for organizing wires or cables in locations other than in an office workstation environment.

Figure 1:
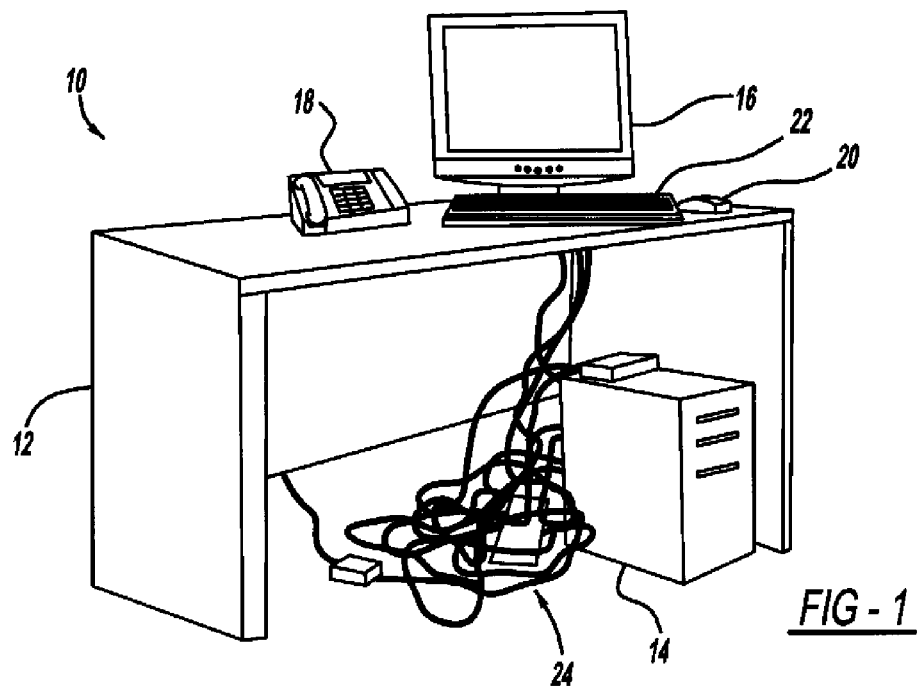
FIG. 1 is an illustration of a typical office work area, showing the cable clutter that commonly exists.

FIG. 1 is an illustration of a typical office work area 10, including a desk 12, a computer base unit 14, a computer monitor 16, and a telephone 18. The computer base unit 14 typically has at least a power cord, a network cable, and a video cable attached to it. The computer base unit 14 may also have attached speaker cables, and cables for peripheral devices such as a mouse 20 and a keyboard 22. The monitor 16 also requires a power cord and the video cable, while the telephone requires 1 or 2 cables as well. In many instances, the office work area 10 may also include a power strip, a printer and/or fax machine, and a network hub unit—none of which are shown in FIG. 1, for clarity.

The wires, cords, and cables described above, collectively known hereinafter as cables 24, present a problem to the person inhabiting the office work area 10. In total, there are frequently a dozen or more of the cables 24 running under and around the desk 12, attaching various electrical and electronic devices. Although many desks, such as the desk 12, include channels in which the cables 24 can be placed, these channels are often of limited utility because the cables 24 tend to be routed in all different directions. As such, the cables 24 don't lend themselves well to placement in a linear channel. Also, the channels are not conducive to picking up the arbitrary amounts of slack that exist, with a different amount of slack present in each of the cables 24. As a result, the cables 24 often end up in a tangled heap on the floor.

Figure 2:
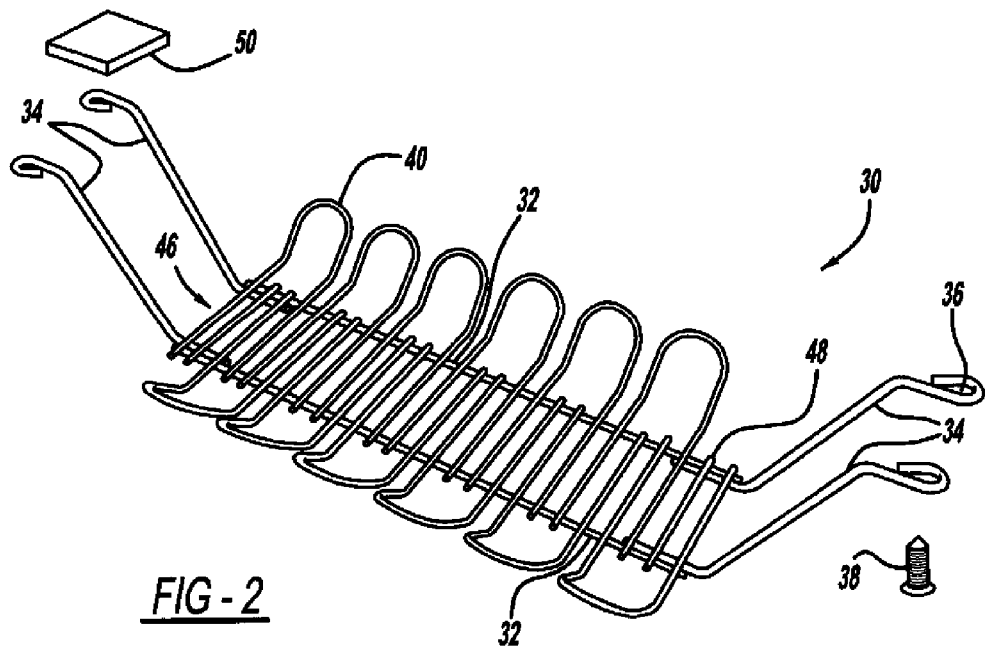
FIG. 2 is an isometric view illustration of a cable organizing device which is designed to solve the cable clutter problem shown in FIG. 1.

FIG. 2 is an isometric view illustration of a cable organizing device 30 which is designed to solve the cable clutter problem described above. The cable organizing device 30 is shown as a welded wire construction, but other materials and construction methods are possible, such as injection molded plastic. The cable organizing device 30 includes two longitudinal wires 32, which provide a structural backbone for the cable organizing device 30. Each of the longitudinal wires 32 has attached a mounting arm 34 at each end, with a screw hole 36 fashioned in the end of each of the mounting arms 34. The screw holes 36 are sized to accept mounting screws 38, which are screwed into a bottom surface of the desk 12 to semi-permanently mount the cable organizing device 30 to the desk 12. Alternatively, two of the mounting arms 34 could be incorporated with each of the longitudinal wires 32 in a single piece of wire.

In another design, not shown, two of the mounting arms 34 on opposite ends of the cable organizing device 30 could be rotated 90 degrees about a longitudinal axis, so that the rotated mounting arms 34 would extend laterally instead of vertically. This would provide a different mounting option where the two rotated mounting arms 34 would be attached to a vertical surface underneath the desk 12, while the two un-rotated mounting arms 34 would still be attached to the bottom horizontal surface of the desk 12.

Figure 2A:
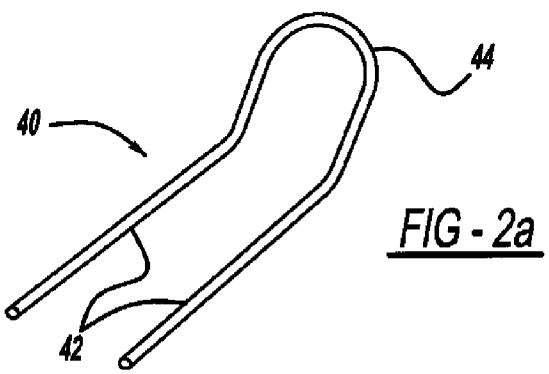
FIG. 2a is an illustration of one of the loop hooks of the cable organizing device shown in FIG. 2.

The cable organizing device 30 also includes a plurality of loop hooks 40, spaced apart and alternately disposed on the left and right sides of the longitudinal wires 32. Each of the loop hooks 40 includes two straight end portions 42, and a U-shaped loop portion 44, as shown in FIG. 2a. For each of the loop hooks 40, both of the end portions 42 are welded to both of the longitudinal wires 32 at the four points where the wires touch. By alternating the arrangement of the loop hooks 40 on the left and right sides of the longitudinal wires 32, it is possible to form a wire mesh tray area 46 in the center of the cable organizing device 30. Only one extra cross-wire 48 may be needed at each end of the cable organizing device 30 in order to complete the wire mesh tray area 46. The tray area 46 can be useful not only for supporting the cables 24, but also for holding other devices, such as the power strip or the network hub device mentioned previously.

Mounting the cable organizing device 30 to the underside of the desk 12 can be simplified through the use of adhesive mounting pads 50. The adhesive mounting pads 50 may be comprised of pieces of double-stick foam tape. The adhesive mounting pads 50 are first affixed to the top surface of each of the screw holes 36. Then the entire cable organizing device 30 is pressed into position on the underside of the desk 12, where it is temporarily held in place by the adhesive mounting pads 50. The installer can then let go of the cable organizing device 30, and use both hands to drive the mounting screws 38 into the underside of the desk 12. At this point, the installation of the cable organizing device 30 is complete.

Figure 3:
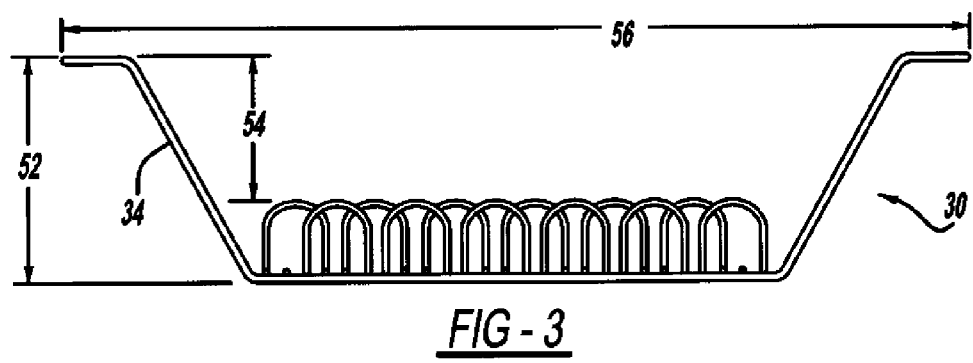
FIG. 3 is a side view of the cable organizing device, showing the configuration of the mounting arms, and the device's length and vertical spacing.

FIG. 3 is a side view of the cable organizing device 30, showing the configuration of the mounting arms 34, and the device's length and vertical sizing. In one preferred design embodiment, an overall height 52 of the cable organizing device 30 is about four inches, with a vertical distance 54 between the loop hooks 40 and the bottom surface of the desk 12 being about three inches. This vertical spacing is intended to provide enough room for the cables 24 to include multiple wraps of large diameter power cords, but still allow the cable organizing device 30 to maintain a low profile underneath the desk 12. The vertical spacing also provides ample room for small electrical or electronic devices, such as a network hub or a power strip, to be placed in the tray area 46. In one embodiment, an overall length 56 of the cable organizing device 30 is about 20 to 24 inches; however, a design about half that length may be useful for smaller spaces, and a longer design is also possible.

Figure 4:
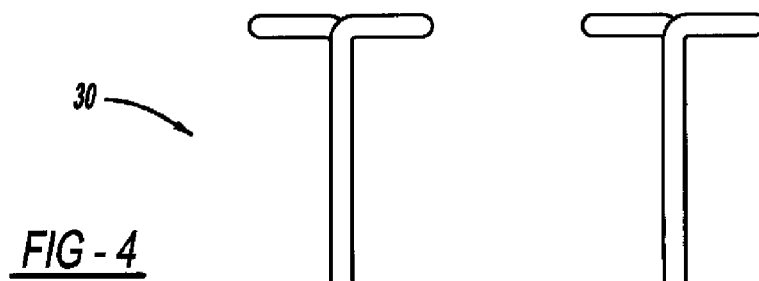
FIG. 4 is an end view of the cable organizing device, showing the device's width and the configuration of the loop hooks.
Figure 4:
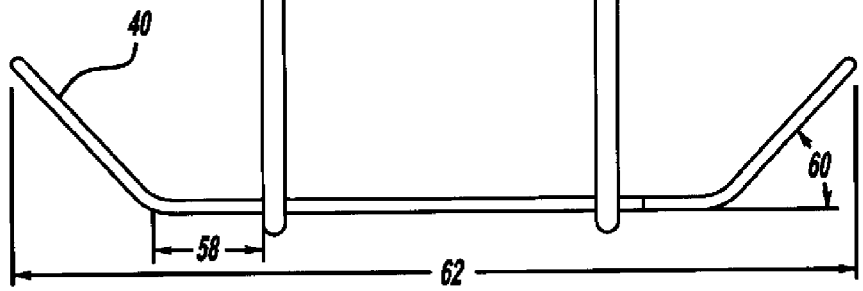

FIG. 4 is an end view of the cable organizing device 30, showing the device's width and the configuration of the loop hooks 40. In one embodiment, the loop hooks 40 extend laterally outward from the longitudinal wires 32 for a distance 58, before bending upward in the loop portion 44. An angle 60 between the loop portion 44 and the end portions 42 is preferably about 45 degrees. The cable organizing device 30 has an overall width 62 of about 6 inches in one design embodiment.

Figure 5:
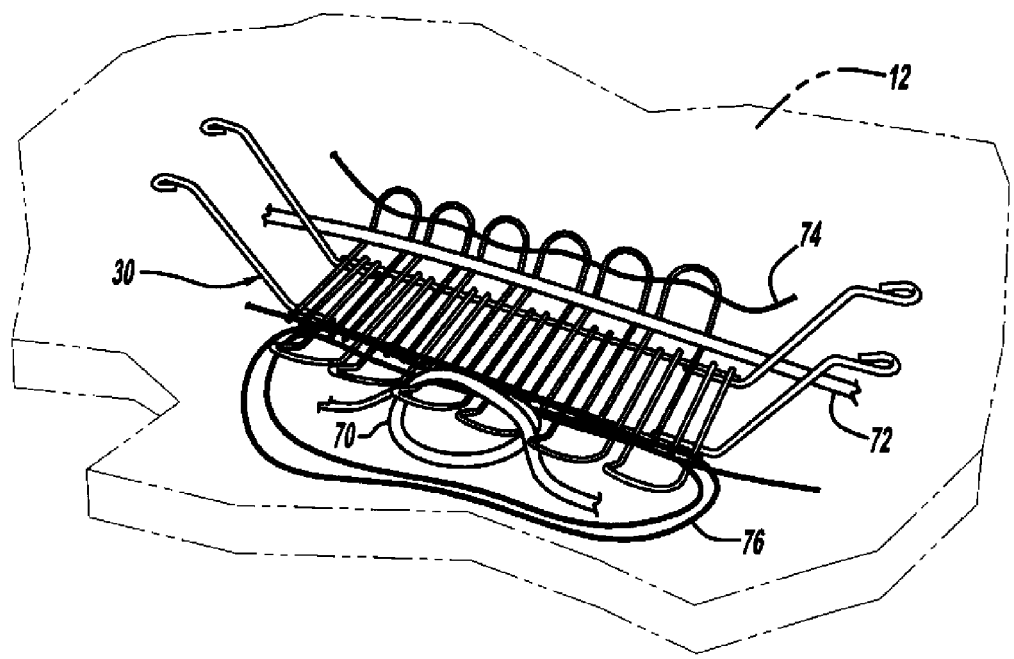
FIG. 5 is an illustration of the cable organizing device mounted under a desk, with several wires and cables being held by the device.

FIG. 5 shows the cable organizing device 30 mounted to the underside of the desk 12. For simplicity, the mounting screws 38 are not shown in FIG. 5. The cable organizing device 30 provides a great deal of versatility in the management and organization of the cables 24. First and foremost, the cable organizing device 30 is designed to handle the situation where each of the cables 24 is already attached at both ends. For example, consider a video cable 70, which connects on one end to the computer base unit 14, and on the other end to the monitor 16. The video cable 70 does not need to be disconnected on either end before being wrapped onto the cable organizing device 30. Rather, the video cable 70 can simply be hooked over or wrapped around two or more of the loop hooks 40, as needed. The spacing between the loop hooks 40 allows any of the cables 24 to be wrapped over, under, and between the loop hooks 40 as necessary and convenient.

Furthermore, each of the cables 24 will likely have a different amount of slack. The cable organizing device 30 can pick up the slack in each of the cables 24 in several different ways. For example, a cable 72 may simply be draped over some of the loop hooks 40 as it passes by the cable organizing device 30, thus holding the slack wire up off the floor. Likewise, a cable 74 may be zig-zagged over and under the loop hooks 40, to pick up slack in the cable 74 and hold it securely in place in the cable organizing device 30. A cable 76 may be coiled around and between any number of the loop hooks 40 on one side of the longitudinal wires 32, to pick up more slack. And if any of the cables 24 has a great deal of slack wire to be taken up, it can be wrapped in a "FIG. 8" pattern around the loop hooks 40 on both sides of the cable organizing device 30, or simply coiled up and placed in the tray area 46. Also, where any of the cables 24 has a free end, it could be threaded through the loop hooks 40 from one side to the other side of the cable organizing device 30.

The cable organizing device 30 is designed to allow the cables 24 to be wrapped onto it quickly and easily, yet hold the cables 24 securely. In most instances, no wire ties or other means are necessary to hold the cables 24 in place on the cable organizing device 30; the upturned design of the loop hooks 40 ensures that the cables 24 do not slip off. And the cable organizing device 30 can handle any type of wire or cable material, from large diameter power cords to thin speaker wire. Even flat ribbon cable will easily fit on the loop hooks 40, thanks to their generous width.

Also, as mentioned above, small devices, such as a network hub or a power strip, can be placed in the tray area 46, thus further reducing clutter on and under the desk 12. Since a network hub, for example, necessarily has some of the cables 24 running to and from it, placing such a device in the cable organizing device 30 is a convenient solution, as the cables 24 can easily be spooled around the loop hooks 40, either before or after connection to the network hub device.

Figure 6:
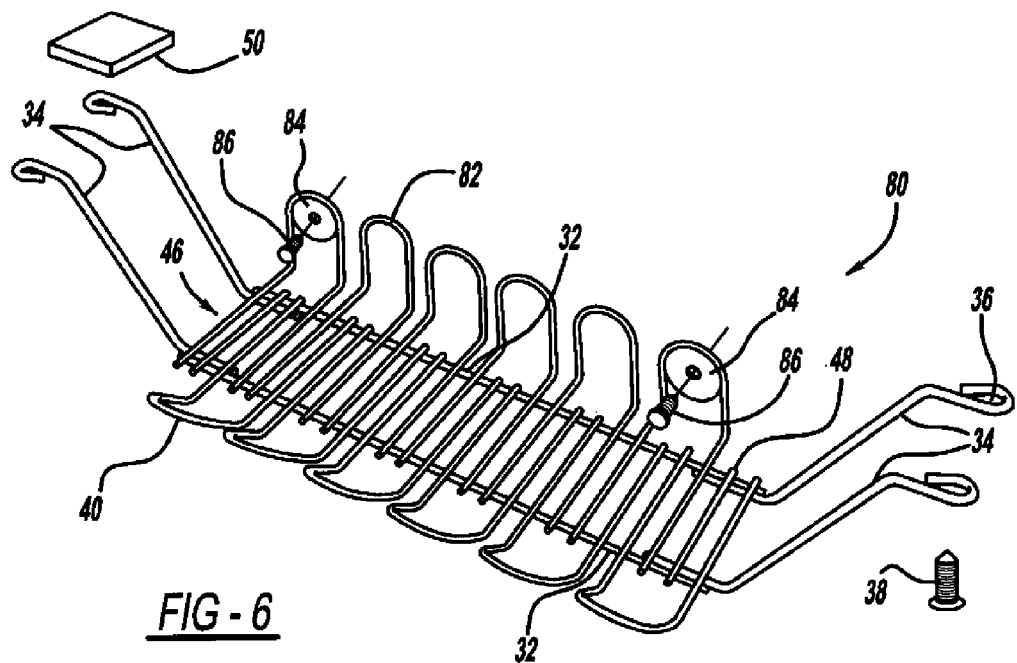
FIG. 6 is an isometric view illustration of an alternate embodiment of the cable organizing device which includes a feature for mounting to a wall or other vertical surface.

FIG. 6 is an isometric view illustration of a cable organizing device 80, an alternate embodiment which includes a feature for mounting to a wall or other vertical surface. In the organizing device 80, the loop hooks 40 on one side retain the shape described previously. However, loop hooks 82 on the other side are bent upward 90 degrees, to a vertical orientation, so that the loop hooks 82 would lie flat against a wall or other vertical surface. A mounting plug 84 and a mounting screw 86 are provided at each end, for mounting the organizing device 80 to the wall. The mounting plug 84 could be welded onto the loop hook 82, or pressed into position in the loop hook 82, so as to provide a rigid attachment. The organizing device 80 could be mounted using only the mounting plug 84 and the mounting screws 86 (to a vertical surface), only the screw holes 36 and the screws 38 (to a horizontal surface), or a combination thereof.

Figure 7:
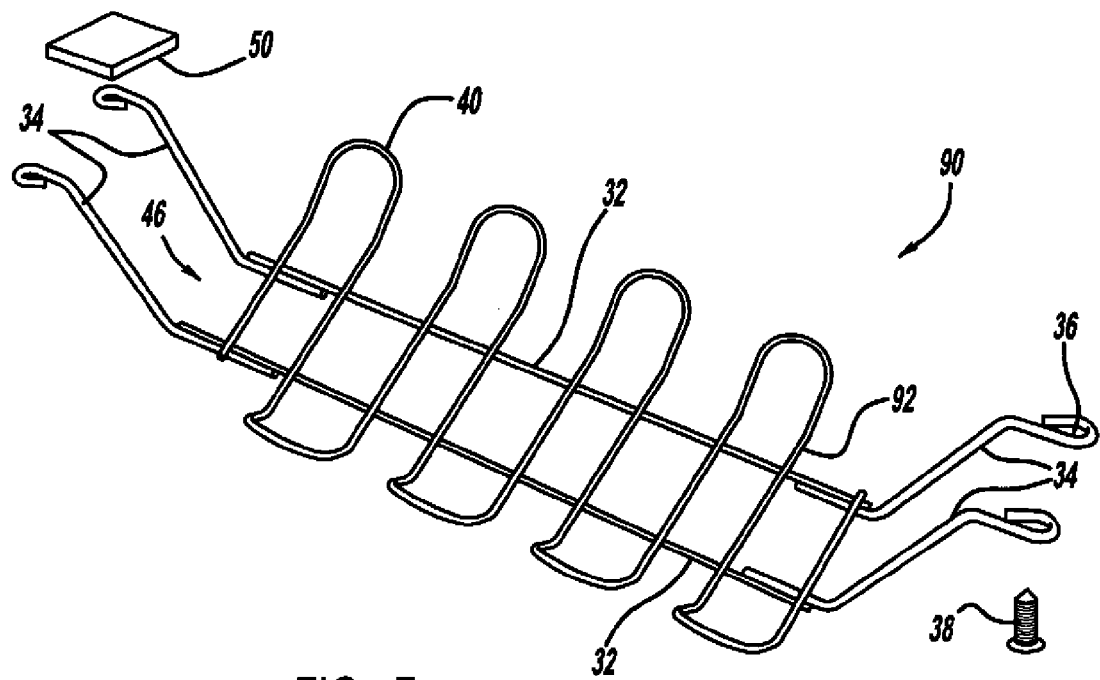
FIG. 7 is an isometric view illustration of an alternate embodiment of the cable organizing device in which a single serpentine-shaped piece of wire replaces many smaller pieces of wire.

FIG. 7 is an isometric view illustration of a cable organizing device 90, an alternate embodiment in which a single serpentine-shaped piece of wire 92 replaces many smaller pieces of wire to form the loop hooks 40. In this design, which may be less expensive to fabricate due to the smaller number of parts involved, the loop hooks 40 alternate position down the sides of the cable organizing device 90. This design would result in a wider spacing of wires in the tray area 46, which may be suitable for some applications.

The design of the cable organizing devices 30, 80 and 90 is such that they are easy and cost-effective to manufacture, yet sturdy and versatile in use. This is due to the combined structural and functional nature of the loop hooks 40 and the longitudinal wires 32. The cable organizing devices 30, 80 and 90 provide a solution to the cable clutter problem which is simple, affordable, versatile, and easy to install.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A cable organizing device comprising:
   a structural backbone including two longitudinal members extending along a length of the cable organizing device to a central tray area operable to support one or more electrical or electronic devices;
   a plurality of generally U-shaped loop hooks longitudinally spaced along said structural backbone to allow cables to be routed therebetween, each loop hook having a pair of interconnected legs rigidly attached to the longitudinal members for further defining the central tray area, wherein the legs of a first set of loop hooks extending laterally from a first side of the structural backbone are interleaved with the legs of a second set of loop hooks extending laterally along a second side of the structural backbone in a direction opposite said first set of loop hooks, and at least a portion of said loop hooks extending away from the central tray area slopes in an upward direction; and
   a mounting arm disposed at each end of the two longitudinal members to define four mounting arm, each mounting arm extending in the upward direction and terminating at a distal end, the distal ends of mounting arms forming a mounting surface within a plane generally parallel to and spaced above the central tray area.

2. The device of claim 1 further comprising four adhesive mounting pads, said adhesive mounting pads being attached to the mounting surfaces, said adhesive mounting pads further being attachable to the lower surface of the desk or table, thus holding the cable organizing device in position and allowing the mounting screws to be installed.

3. The device of claim 1 wherein the longitudinal members, the loop hooks, and the mounting arms are all made of a wire material.

4. The device of claim 3 wherein each of the loop hooks is an individual piece of formed wire which is welded or soldered to the longitudinal members at each point where the formed wire contacts the longitudinal members.

5. The cable organizing device of claim 1 wherein the distal end of each mounting leg has a hole extending therethrough for receiving a mounting screw configured to attach the cable organizing device to a bottom side of a horizontal surface.

6. The cable organizing device of claim 1 wherein said upwardly extending mounting arms also extend longitudinally outwardly from the two longitudinal members.

7. A cable organizing device comprising:
   a structural backbone including two longitudinal members extending along a length of the cable organizing device to a central tray area operable to support one or more electrical or electronic devices;
   a serpentine member comprised of a wire material defining a plurality of generally U-shaped loop hooks longitudinally spaced along said structural backbone to allow cables to be routed therebetween and further define the central tray area, wherein a first set of loop hooks extending laterally from a first side of the structural backbone are interposed between a second set of loop hooks extending laterally along a second side of the structural backbone in a direction opposite said first set of loop hooks such that the U-shaped loop hooks are alternately disposed along opposite sides of the structural backbone, and at least a portion of said loop hooks extending away from the central tray area slopes in an upward direction; and
   a mounting arm disposed at each end of the two longitudinal members to define four mounting arm, each mounting arm extending in the upward direction and terminating at a distal end, the distal ends of the mounting arms forming a mounting surface within a plane generally parallel to and spaced above the central tray area.

8. The device of claim 7 wherein the loop hook member is welded or soldered to the longitudinal members at each point where the loop hook member contacts the longitudinal members.

9. The cable organizing device of claim 7 wherein the distal end of each mounting leg has a hole extending therethrough for receiving a mounting screw configured to attach the cable organizing device to a bottom side of a horizontal surface.

10. The cable organizing device of claim 7 wherein said upwardly extending mounting arms also extend longitudinally outwardly from the two longitudinal members.

11. A cable organizing device comprising:
    a structural backbone including two longitudinal members extending along a length of the cable organizing device to a central tray area operable to support one or more electrical or electronic devices;
    a plurality of generally U-shaped loop hooks longitudinally spaced along said structural backbone to allow cables to be routed therebetween, each loop hook having a pair of interconnected legs rigidly attached to the longitudinal members for further defining the central tray area, wherein the legs of a first set of loop hooks extending laterally from a first side of the structural backbone are interleaved with the legs of a second set of loop hooks extending laterally along a second side of the structural backbone in a direction opposite said first set of loop hooks, wherein at least a portion of said first set of loop hooks being turned upward 90 degrees relative to the central tray area and at least a portion of said second set of loop hooks extending away from the central tray area slopes in an upward direction;

at least two mounting plugs, where each of the mounting plugs is affixed to one of the first set of loop hooks; and a mounting arm disposed at each end of at least one longitudinal member to define two mounting arm, each mounting arm extending in the upward direction and terminating at a distal end, the distal ends of mounting arms forming a mounting surface within a plane generally parallel to and spaced above the central tray area.

12. The device of claim 11 further comprising two adhesive mounting pads, said adhesive mounting pads being attached to the mounting surfaces, said adhesive mounting pads further being attachable to the lower surface of the desk or table, thus holding the cable organizing device in position and allowing the mounting screws to be installed.

13. The cable organizing device of claim 11 wherein the distal end of each mounting leg has a hole extending therethrough for receiving a mounting screw configured to attach the cable organizing device to a bottom side of a horizontal surface.

14. The cable organizing device of claim 11 wherein said upwardly extending mounting arms also extend longitudinally outwardly from the two longitudinal members.

15. A cable organizing device comprising:

a structural backbone including two longitudinal members extending along a length of the cable organizing device to a central tray area operable to support one or more electrical or electronic devices;

a serpentine member comprised of a wire material defining a plurality of generally U-shaped loop hooks longitudinally spaced along said structural backbone to allow cables to be routed therebetween and further define the central tray area, wherein a first set of loop hooks extending laterally from a first side of the structural backbone are interposed between a second set of loop hooks extending laterally along a second side of the structural backbone in a direction opposite said first set of loop hooks such that the U-shaped loop hooks are alternately disposed along opposite sides of the structural backbone, wherein at least a portion of said first set of loop hooks being turned upward 90 degrees relative to the central tray area and at least a portion of said second set of loop hooks extending away from the central tray area slopes in an upward direction;

at least two mounting plugs, where each of the mounting plugs is affixed to one of the first set of loop hooks; and a mounting arm disposed at each end of at least one longitudinal member to define two mounting arm, each mounting arm extending in the upward direction and terminating at a distal end, the distal ends of mounting arms forming a mounting surface within a plane generally parallel to and spaced above the central tray area.

16. The device of claim 15 further comprising two adhesive mounting pads, said adhesive mounting pads being attached to the mounting surfaces, said adhesive mounting pads further being attachable to the lower surface of the desk or table, thus holding the cable organizing device in position and allowing the mounting screws to be installed.

17. The cable organizing device of claim 15 wherein the distal end of each mounting leg has a hole extending therethrough for receiving a mounting screw configured to attach the cable organizing device to a bottom side of a horizontal surface.

18. The cable organizing device of claim 15 wherein said upwardly extending mounting arms also extend longitudinally outwardly from the two longitudinal members.

\* \* \* \* \*